United States Patent
Takamizawa et al.

[15] 3,666,831
[45] May 30, 1972

[54] THIOL-TYPE THIAMINE THIONOTHIOLCARBONATES

[72] Inventors: Akira Takamizawa, Ibaraki-shi; Kentaro Hirai, Kyoto-shi, both of Japan

[73] Assignee: Shionogi & Co., Ltd., Osaka, Japan

[22] Filed: Feb. 17, 1969

[21] Appl. No.: 799,899

[30] Foreign Application Priority Data

Mar. 5, 1968 Japan..................................43/14148
July 11, 1968 Japan..................................43/48672
July 11, 1968 Japan..................................43/48674

[52] U.S. Cl......................260/256.5 B, 260/649 D, 424/251
[51] Int. Cl. .........................................................C07d 51/42
[58] Field of Search...........................................260/256.5 B

[56] References Cited

UNITED STATES PATENTS 3,502,674   3/1970   Takamizawa et al. ..............260/256.5
3,183,232   5/1965   Takamizawa.......................260/250.5
3,444,167   5/1969   Murakami et al...................260/256.5

FOREIGN PATENTS OR APPLICATIONS 14,388   11/1966   Japan..................................260/256.5

Primary Examiner—Alex Mazel
Assistant Examiner—R. J. Gallagher
Attorney—Wenderoth, Lind & Ponack

[57] ABSTRACT

Thiol-type thiamine thionothiolcarbonates, i.e. O-(lower)-alkoxycarbonyl-S-(substituted or unsubstituted)-phenylthiothiocarbonylthiamines, being prepared from S-alkali salts of O-(lower)-alkoxycarbonylthiamines by an interaction with (substituted or unsubstituted)-phenylthiothiocarbonyl group-introducing agents, or from S-alkali salts of thiamine by an interaction with the (substituted or unsubstituted)-phenylthiothiocarbonyl group-introducing agents followed by alkoxycarbonylation of the O-position, possessing anti-inflammatory activity and also rapid, prolonged and high level vitamin $B_1$ activity, and being sufficiently stable for various pharmaceutical preparations.

11 Claims, No Drawings

THIOL-TYPE THIAMINE THIONOTHIOLCARBONATES

This invention relates to thiol-type thiamine thionothiolcarbonates and production thereof. More particularly, the present invention relates to O-(lower)-alkoxycarbonyl-S-(substituted or unsubstituted)-phenylthiothiocarbonylthiamines and production thereof.

The said O-(lower)-alkoxycarbonyl-S-(substituted or unsubstituted)-phenylthiothiocarbonylthiamines are representable by the following Formula I:

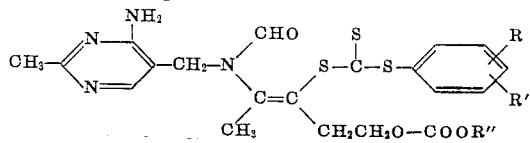

wherein each R and R' is independently a member selected from the group consisting of hydrogen, lower alkyl, lower alkoxy and halogen and R" is lower alkyl. The compounds represented by the above Formula I show marked anti-inflammatory activity, even when administered orally, as well as vitamin B₁ activity, and are useful as medicaments.

Accordingly, a fundamental object of the present invention is to embody novel thiol-type thiamine thionothiolcarbonates and process for preparation thereof. Another object of the invention is to embody thiol-type thiamine thionothiolcarbonates being useful as anti-inflammatory and vitamin B₁ agents, particularly suited to oral administration. A further object of the invention is to embody thiol-type thiamine thionothiolcarbonates having sufficient stability for various pharmaceutical preparations. A still further object of the invention is to embody pharmaceutical compositions comprising thiol-type thiamine thionothiolcarbonates being suited to the treatment of inflammation, edema or vitamin B₁ deficiency. These and other objects of the invention will be apparent to those conversant with the art to which the present invention pertains from the subsequent descriptions.

The thiol-type thiamine thionothiolcarbonates represented by the Formula I can be prepared in a variety of different ways of which general aspect may be illustrated by the following scheme:

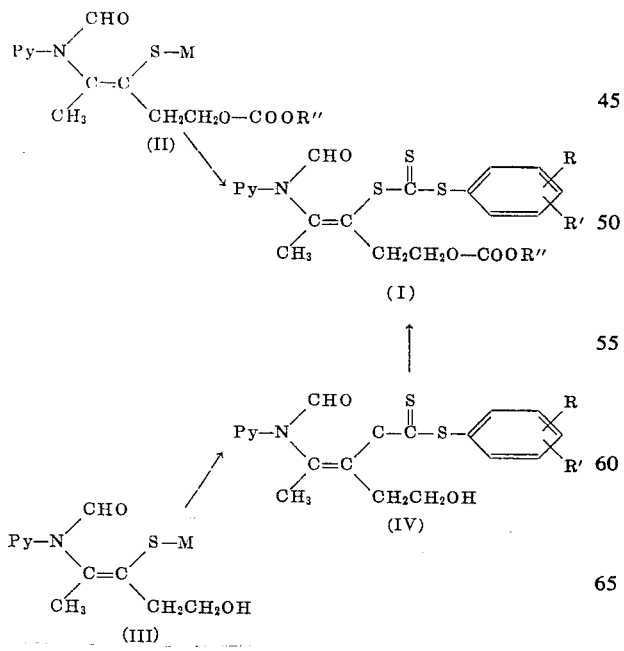

wherein Py is 2-methyl-4-aminopyrimidin-5-ylmethyl group, M is alkali metal or alkaline earth metal, and R, R' and R" each has the same significance as designated above.

As illustrative of the objective compounds of the Formula I are O-methoxycarbonyl-S-phenylthiothiocarbonylthiamine, O-ethoxycarbonyl-S-phenylthiothiocarbonylthiamine, O-ethoxycarbonyl-S-(p-tolythio)-thiocarbonylthiamine, O-butoxycarbonyl-S-(m-tolylthio)-thiocarbonylthiamine, O-ethoxycarbonyl-S-(2,4-xylythio)-thiocarbonylthiamine, O-ethoxycarbonyl-S-(3,5-xylylthio)-thiocarbonylthiamine, O-ethoxycarbonyl-S-(p-methoxyphenylthio)-thiocarbonylthiamine, O-ethoxycarbonyl-S-(o-methoxyphenylthio)-thiocarbonylthiamine, O-ethoxycarbonyl-S-(o-bromophenylthio)-thiocarbonylthiamine, O-butoxycarbonyl-S-(m-bromophenylthio)-thiocarbonylthiamine, O-ethoxycarbonyl-S-(p-iodophenylthio)-thiocarbonylthiamine, O-methoxycarbonyl-S-(p-chlorophenylthio)-thiocarbonylthiamine, O-ethoxycarbonyl-S-(2,4-dibromophenylthio)-thiocarbonylthiamine, O-butoxycarbonyl-S-(3,5-dichlorophenylthio)-thiocarbonylthiamine and the like.

According to the present invention, the compounds of the Formula I can be produced by some different methods, which are illustrated in detail below, respectively.

1. From an S-alkali salt of O-(lower)-alkoxycarbonylthiamine (II)

The S-alkali salt of O-(lower)-alkoxycarbonylthiamine (II) is usually unstable, but can be easily derived from stable compounds, i.e. O-(lower)-alkoxycarbonylthiamine salt (V) and S-(lower)-alkoxycarbonylthiamine (VI), by treatment with an alkali such as sodium hydroxide, potassium hydroxide, calcium hydroxide, sodium ethoxide, potassium ethoxide or the like (cf. Chem. Pharm. Bull., 10, 1102 (1962); ibid., 10, 1107 (1962); ibid., 11, 882 (1963)).

Accordingly, it may be preferred to prepare the starting S-alkali salt of O-(lower)-alkoxycarbonylthiamine (II) from the above mentioned stable compounds and then subject it to the introduction into the S-position of the phenylthiothiocarbonyl group without isolation or purification. For this purpose, an O-(lower)-alkoxycarbonylthiamine salt (V) or an S-(lower)-alkoxycarbonylthiamine (VI) is treated with an alkali in a suitable solvent according to a conventional manner. These reactions may be illustrated by the following scheme:

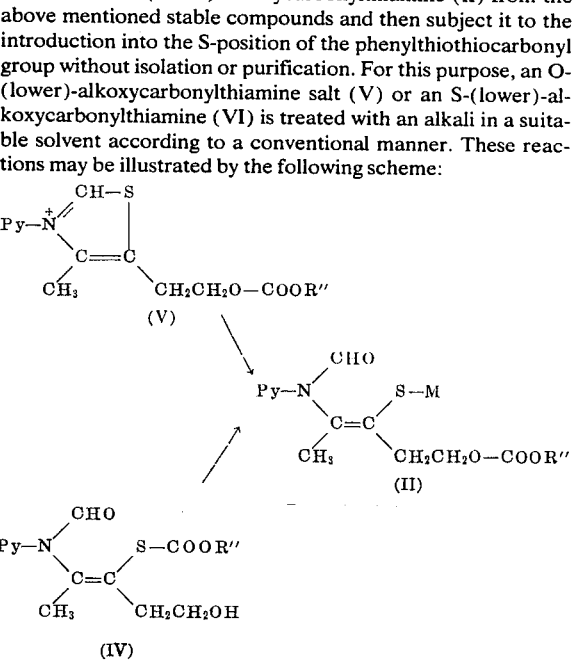

wherein Py, M and R" each has the same significance as designated above.

More specifically, for instance, the O-(lower)-alkoxycarbonylthiamine salt (V) or the S-(lower)-alkoxycarbonylthiamine (VI) is treated with an alkali metal alkoxide or an alkaline earth metal alkoxide in a suitable organic solvent such as a lower alkanol (e.g. methanol, ethanol, propanol), a lower aliphatic ketone (e.g. acetone, methylethylketone), a cyclic ether (e.g. tetrahydrofuran, dioxan), a lower alkane nitrile e.g. acetonitrile), a di-(lower)-alkylformamide (e.g. dimethylformamide), benzene and chloroform. Alternatively, this reaction may be carried out in an aqueous medium with an alkali metal hydroxide or an alkaline earth metal hydroxide. In either case, the reaction is carried out at a room temperature, preferably at 10° to 20° C. Though it is possible to isolate and purify the thus produced S-alkali salt of O(lower)-alkoxycarbonylthiamine (II), it is usually advantageous to effect the introduction of a substituted or unsubstituted phenylthiothiocarbonyl group without isolation or purification as mentioned above. Of course, the introduction of the phenylthiothiocarbonyl group can be effected in the same solvent as employed in the preparation of the starting compound (II).

The introduction of the phenylthiothiocarbonyl group may be effected with (a) a substituted or unsubstituted phenylthiothiocarbonyl halogenide or (b) a combination of carbon dioxide and a di-(substituted or unsubstituted phenyl)-halonium salt.

When the substituted or unsubstituted phenylthiothiocarbonyl halogenide is employed as the phenylthiothiocarbonyl group-introducing agent, the reaction is effected at a temperature ranging from about −50° to about 50° C, preferably from −30° to 0° C. As mentioned above, the reaction may be carried out in such a solvent as water, a lower alkanol (e.g. methanol, ethanol, propanol), a lower aliphatic ketone (e.g. acetone, methylethylketone), a cyclic ether (e.g. tetrahydrofuran, dioxan), a lower alkane nitrile (e.g. acetonitrile), a di-(lower)-alkylformamide (e.g. dimethylformamide), benzene, chloroform and the like. As illustrative of the substituted or unsubstituted phenylthiothiocarbonyl halogenide are phenylthiothiocarbonyl chloride, phenylthiothiocarbonyl bromide, phenylthiothiocarbonyl iodide, p-tolylthiothiocarbonyl chloride, m-tolylthiothiocarbonyl chloride, o-tolylthiothiocarbonyl chloride, 2,4-xylylthiothiocarbonyl chloride, 3,5-xylylthiothiocarbonyl chloride, p-methoxyphenylthiothiocarbonyl chloride, o-methoxyphenylthiothiocarbonyl chloride, o-bromophenylthiothiocarbonyl chloride, m-bromophenylthiothiocarbonyl chloride, p-iodophenylthiothiocarbonyl chloride, p-chlorophenylthiothiocarbonyl chloride, 2,4-dichlorophenylthiothiocarbonyl chloride, 3,5-dichlorophenylthiothiocarbonyl chloride and the like. Usually, the reaction proceeds very smoothly within few hours, and the product, i.e. O-(lower)-alkoxycarbonyl-S-(substituted or unsubstituted)-phenylthiothiocarbonylthiamine (I), can be isolated and purified by per se conventional procedures such as solvent extraction, chromatography, recrystallization and the like.

On the other hand, when the combination of carbon disulfide and di-(substituted or unsubstituted phenyl)-halonium salt is employed as the phenylthiothiocarbonyl group-introducing agent, the introduction of the phenylthiothiocarbonyl group is performed in two steps, i.e. the first one is an interaction of the starting material (II) with carbon disulfide and the second one is an interaction of the resulting intermediary compound with a di-(substituted or unsubstituted phenyl)-halonium salt. The intermediary compound produced in the first step may be represented by the following formula:

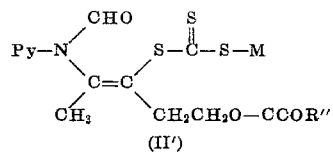

(II′)

wherein Py, M and R″ each has the same significance as designated above, but isolation of this intermediate is dispensable.

In the first step, the starting S-alkali salt of O-(lower)-alkoxycarbonylthiamine (II) is reacted with carbon disulfide at a temperature ranging from about −10° to about 50° C, preferably around 15° C, in a suitable solvent such as water, a lower alkanol (e.g. methanol, ethanol, propanol), a lower aliphatic ketone e.g. acetone, methylethylketone), a cyclic ether e.g. tetrahydrofuran, dioxan), a lower alkane nitrile (e.g. acetonitrile), a di-(lower)-alkylformamide (e.g. dimethylformamide), benzene, chloroform and the like. The reaction is usually completed within several hours, and the above illustrated intermediary compound (II′) is afforded. To the thus obtained reaction mixture, there is subsequently added a di-(substituted or unsubstituted phenyl)-halonium salt. This second step reaction may be executed at a temperature ranging from about −20° to about 50° C, preferably from 0° to 10° C. The reaction time depends upon the reaction condition, but the reaction is generally completed within about 10 hours. The di-(substituted or unsubstituted phenyl)-halonium salt employed in this step may be represented by the following formula:

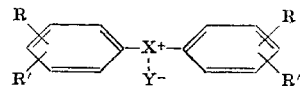

wherein X is halogen, Y is inorganic acid residue (e.g. halogen, $NO_3$, $1/2SO_4$, $ClO_3$, etc), and R and R' each has the same significance as designated above. This reagent can be prepared by the method described by F. M. Beringer et al (J. Am. Chem. Soc., 75, 2705 (1953)). As illustrative of the di-(substituted or unsubstituted phenyl)-halonium salt are diphenyliodonium iodide, diphenyliodonium bromide, diphenyliodonium sulfate, diphenyliodonium iodate, di-(p-tolyl)-iodonium bromide, di-(m-tolyl)- iodonium iodide, di-(2,4-xylyl)-iodonium iodide, di-(3,5-xylyl)-iodonium iodide, di-(p-methoxyphenyl)-iodonium iodide, di-(o-methoxyphenyl)-iodonium iodide, di(o-bromophenyl)-iodonium iodide, di-(p-chlorophenyl)-iodonium iodide, di-(2,4-dichlorophenyl)-iodonium iodide, di-(3,5-dibromophenyl)-iodonium iodide and the like. The isolation and purification of the objective compounds (I) can be effected in per se conventional manners as described above.

2. From an S-alkali salt of thiamine (III):

The objective thiol-type thiamine thionothiolcarbonates (I) can also be prepared from an S-alkali salt of thiamine (III) by introduction of the phenylthiothiocarbonyl group to the S-position and subsequent alkoxycarbonylation of the O-position. The introduction of phenylthiothiocarbonyl group into the S-position of the starting material (III) can be executed in the same manner to those for the above-mentioned phenylthiothiocarbonylation of the other starting material (II), i.e. with the substituted or unsubstituted phenylthiothiocarbonyl halogenides or with the combination of carbonyl disulfide and the di-(substituted or unsubstituted phenyl)-halonium salts. The thus prepared S-(substituted or unsubstituted)-phenylthiothiocarbonylthiamines (IV) are then subjected to an alkoxycarbonylation of the remaining O-position.

The alkoxycarbonylation may be effected with a carbonyl dihalogenide and a lower alkanol. This reaction is usually executed in two steps, i.e. the first one is an interaction of the S-phenylthiothiocarbonylthiamine (IV) with a carbonyl dihalogenide to obtain an intermediary O-halogenocarbonyl compound (IV′) and the second one is an interaction of the intermediary compound (IV′) with a lower alkanol. The intermediary compound (IV′), i.e. O-halogenocarbonyl-S-(substituted or unsubstituted)-phenylthiothiocarbonylthiamine, may be represented by the following formula:

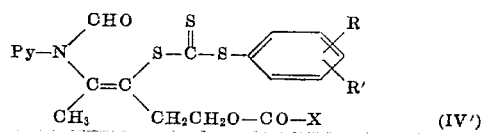

(IV′)

wherein X is halogen, and R, R' and Py each has the same significance as designated above, but isolation of this intermediary compound is also dispensable.

In the first step, the S-(substituted or unsubstituted)-phenylthiothiocarbonylthiamine (IV) is reacted with a carbonyl dihalogenide (e.g. phosgene, bromophosgene, iodophosgene) in an inert solvent such as benzene, toluene, ether, tetrahydrofuran, dioxane, chloroform, dichloromethane, trichloroethane, acetone, dimethylformamide, acetonitrile or the like. The reaction proceeds automatically with generation of heat, and no external heating is required. But, if necessary, the reaction mixture may be cooled to keep a moderate reaction velocity.

In the second step, the thus-prepared O-halogenocarbonyl-S-(substituted or unsubstituted)-phenylthiothiocarbonylthiamine (IV') is then reacted with a lower alkanol such as methanol, ethanol, propanol, butanol or the like. The reaction may be carried out at a temperature ranging from about 0° to about 100° C, preferably from 10° to 50° C. As the lower alkanol can play a role of a reaction solvent as well as a reagent, no further solvent is requisite. Although the present alkoxycarbonylation has been above illustrated step by step, these steps may be effected successively without isolation of the intermediary compound (IV').

The objective produce, i.e. O-(lower)-alkoxycarbonyl-S-(substituted or unsubstituted)-phenylthiothiocarbonylthiamine (I), may be converted into an acid addition salt by a per se conventional method. Examples of the acid addition salt include hydrochloride, hydrobromide, hydroiodide, sulfate, nitrate, rhodanate, citrate, oxalate and the like.

The thus-prepared O-(lower)-alkoxycarbonyl-S-(substituted or unsubstituted)-phenylthiothiocarbonylthiamines and acid addition slats thereof are useful as medicaments possessing anti-inflammatory activity, and also rapid, prolonged and high level vitamin $B_1$ activity.

Changes in the level of vitamin $B_1$ in blood by oral administration of O-(lower)-alkoxycarbonyl-S-(substituting or unsubstituted)-phenylthiothiocarbonylthiamines were determined in rabbits and the results are shown in the following Table 1, in contrast with thiamine chloride hydrochloride and thiamine propyl disulfide:

TABLE 1

Vitamin $B_1$ Concentration in Blood

| Test Compound | Vita min $B_1$ Concentration($\gamma$/dl) | | | | | |
|---|---|---|---|---|---|---|
| Time (hr) | 0 | 0.5 | 1 | 3 | 5 | 8 |
| O-Ethoxycarbonyl-S-phenylthiothiocarbonylthiamine | 21.8 | 34.4 | 46.2 | 53.4 | 50.1 | 39.0 |
| O-Ethoxycarbonyl-S-(p-tolythio)-thiocarbonylthiamine | 27.4 | 42.9 | 51.6 | 60.1 | 58.6 | 49.4 |
| O-Ethoxycarbonyl-S-(3,5-xylylthio)-thiocarbonylthiamine | 27.4 | 37.4 | 48.8 | 62.1 | 56.4 | 44.2 |
| Thiamine propyl disulfide | 23.5 | 42.7 | 52.5 | 59.4 | 56.8 | 44.3 |
| Thiamine chloride hydrochloride - chloride | 22.2 | 24.5 | 27.5 | 32.9 | 34.4 | 28.7 |

Note: Each (5 mg as thiamine chloride hydrochloride per kg of body weight) of the test compounds was administered orally to each test rabbits. At a certain time after oral administration, vitamin $B_1$ concentration in blood was determined chemically.

Thus, the O-(lower)-alkoxycarbonyl-S-(substituted or unsubstituted)-phenylthiothiocarbonylthiamines (I) can be absorbed from the intestinal canal better than thiamine chloride hydrochloride and the former can maintain vitamin $B_1$ activity for a longer time than the latter. These characteristic properties are almost equal to those of thiamine propyl disulfide, which is one of the most excellent and the most frequently used viatmin $B_1$ agents.

The O-(lower)-alkoxycarbonyl-S-(substituted or unsubstituted)-phenylthiothiocarbonylthiamines (I) possess a high anti-inflammatory activity, and are particularly distinguishable from the ever known vitamin $B_1$ derivatives having anti-inflammatory activity in the fact that the former are active even when administered orally, whereas the latter are active only when administered orally. For instance, edema inhibition activity, abscess inhibition activity and granulation inhibition activity of the O-(lower)-alkoxycarbonyl-S-(substituted or unsubstituted)-phenylthiothiocarbonylthiamines (I), when administered orally, were examined in rats, and the results are shown in the following Table 2, in contrast with thiamine propyl disulfide:

TABLE 2

Anti-inflammatory Activity

| Test Compound | Edema[1] Inhibition (%) | Abscess[2] Inhibition (%) | Granulation[3] Inhibition (%) |
|---|---|---|---|
| O-Ethoxycarbonyl-S-phenylthiothiocarbonylthiamine | 29.7 | 24 | 56.9 |
| O-Ethoxycarbonyl-S-(p-tolylthio)-thiocarbonylthiamine | 56.6 | 29.3 | 38.3 |
| O-Ethoxycarbonyl-S-(3,5-xylylthio)-thiocarbonylthiamine | 24.9 | 17.9 | 30.9 |
| Thiamine propyl disulfide | 45.3 (750 mg/kg) | 13.7 | 8.8 |

Note: 1. The rats were orally pretreated with the test compound (100 mg/kg, unless otherwise specified) and then the phlogistic agent, 1% carrageenin, is subcutaneously administered. The produced edema was measured and compared with that produced without pretreatment. The edema inhibition activity is expressed as percent inhibition.

2. Abscess was produced by subcutaneous injection of 2% carrageenin in the sacral region of rats. Then, the test compound (250 mg/kg, totally) was administered orally. One-half of the total dose was administered immediately after the injection and the remaining half was administered 3 hours later. The rats were sacrificed 24 hours after the injection, and the abscess was dissected and weighed. The abscess inhibition activity is expressed as percent inhibition.

3. Granuloma was produced by embedding carrageenin-soaked filter paper-pellet into the lacterovetral region of rats. Then, the test compound (250 mg/kg, daily) was administered once daily for 6 days. Twenty four hours after the last administration, the rats were sacrificed, and the granuloma dissected and weighed. The granulation inhibition activity is expressed as percent inhibition.

As apparent from the above Table 2, the anti-inflammatory activity of the O-(lower)-alkoxycarbonyl-S-(substituted or unsubstituted)-phenylthiothiocarbonylthiamines (I) is far superior to that of the ever known vitamin $B_1$ derivative, i.e. thiamine propyl disulfide.

Further, exudation inhibition activity of the O-(lower)-alkoxycarbonyl-S-(substituted or unsubstituted)-phenylthiothiocarbonylthiamines (I) was determined in rats, and the results are shown in the following Table 3, in contrast with a typical and commercially available anti-inflammatory agent, phenylbutazone.

TABLE 3

Anti-inflammatory Activity (Exudation Inhibition Activity)

| Test Compound | Total Dose (mg/rat) | Volume of Exudate (ml) | Percent Inhibition (%) |
|---|---|---|---|
| O-Ethoxycarbonyl-S-phenylthiothiocarbonylthiamine | 400 | 16.2 ± 0.8 | 57 |
| O-Ethoxycarbonyl-S-(p-tolylthio)-thiocarbonylthiamine | 400 | 20.1 ± 1.6 | 46 |
| O-Ethoxycarbonyl-S-(3,5-xylylthio)-thiocarbonylthiamine | 400 | 29.7 ± 1.5 | 20 |
| Phenylbutazone | 400 | 29.4 ± 2.5 | 20 |
| Control | Sesami oil | 37.3 ± 3.0 | — |

Note: A volume of 20 ml of nitrogen gas was injected subcutaneously into the back of rats to make a pouch, into the cavity of which 0.5 ml of 10% croton oil was injected. The administration of the test compound started on the same day, orally once daily for 10 days. On the 11th day, 24 hours after the last administration, the rats were sacrificed, and the volume of the exudate was measured.

It is clear from the Table 3, the exudation inhibition potencies of O-ethoxycarbonyl-S-phenylthiothiocarbonylthiamine and O-ethoxycarbonyl-S-(p-tolylthio)-thiocarbonylthiamine are approximately 2 - 3 times that of phenylbutazone.

Likewise, the exudation inhibition potency of O-ethoxycarbonyl-So(3,5-xylylthio)-thiocarbonylthiamine is almost the same as that of phenylbutazone.

The acute toxicity of the O-(lower)-alkoxycarbonyl-S-(substituted or unsubstituted)-phenylthiothiocarbonylthiamines was investigated in mice, and the median lethal dose values, i.e. $LD_{50}$ values, of O-ethoxycarbonyl-S-phenylthiothiocarbonyl thiamine, O-ethoxycarbonyl-S-(p-tolylthio)-thiocarbonylthiamine and O-ethoxycarbonyl-S-(3,5-xylylthio)-thiocarbonylthiamine were determined to be more than 800 mg/kg subcutaneously, whereas those of thiamine propyl disulfide and phenylbutazone were 450 mg/kg and 280 mg/kg, respectively.

Thus, the O-(lower)-alkoxycarbonyl-S-(substituted or unsubstituted)-phenylthiothiocarbonylthiamines are remarkable active anti-inflammatory agents of low toxicity. They are also characterized in that their anti-inflammatory activity is accompanied with an excellent vitamin $B_1$ activity. Moreover, the anti-inflammatory agents of the present invention are non-steroidal and thus are free of the disadvantages of the latter and which are useful, with great advantage vis-a-vis phenylbutazone or thiamine propyl disulfide for example, in treatment of various inflammation conditions in the living body (human or animal), especially accompanied by vitamin $B_1$ deficiency.

The O-(lower)-alkoxycarbonyl-S-(substituted or unsubstituted)-phenylthiothiocarbonylthiamines and acid addition salts thereof are administered in dosage unit form, as carried by a suitable pharmaceutical carrier, to living bodies particularly for the relief of various inflammations and edemata, e.g. rheumatism, especially accompanied by vitamin $B_1$ deficiency. Normally the preparation is orally administered, although they are just as effective when otherwise administered. They may be administered in various dosages e.g. 10, 20, 30, 50, 100, 150, 200 or 300 milligrams, although the unit dosage range may vary more broadly from about 5 to 1,000 milligrams and preferably from 10 to 300 milligrams. It can be added to or otherwise used with various pharmaceutical carriers. By way of exemplification, various solid carriers may be employed such as lactose, mannitol, corn starch, talc and magnesium stearate as well as other tableting aids and fillers. If desired, some other ingredients such as prednisolone, dexamethasone, betamethasone, acetylsalicylic acid, chloroquine, aminopyrine, indomethacin, phenylbutazone and the like can be mixed with the presently provided thiamine thionothiolcarbonates. The medicinal mixtures can then be tableted or encapsulated in a hard gelatine capsule, depending on the commercial unit form desired. Ordinarily, tableting is preferred. The amount of carrier or diluent may vary, according to tablet size desired or whether the dosage is made up in encapsulated form, from zero to the maximum amount consistent with the practical limits of bulk for a dosage unit. Normally the carrier with which the medicament is mixed does not exceed about 300 to 500 milligrams.

Following examples are given as illustration of presently-preferred embodiments of the invention. It should be understood, however, that they are given solely for the purpose of illustration and are not to be construed as limitative of this invention, many minor variations of which are possible. In the examples which follow, parts by weight bear the same relation to parts by volume as do grams to milliliters. The temperatures are set forth in degree centigrade. The abbreviations have conventional significances.

EXAMPLE 1.

Preparation of O-Ethoxycarbonyl-S-phenylthiothiocarbonylthiamine

Procedure 1a

To a suspension of S-ethoxycarbonylthiamine (17.7 parts by weight) in anhydrous ethanol (150 parts by volume) is added dropwise a solution of metallic sodium (1.15 parts by weight) in anhydrous ethanol (100 parts by volume) at 10° – 15° C. The mixture is warmed to 20° C and allowed to stand at the same temperature for 5 minutes. To the thus prepared solution of S-sodium salt of O-ethoxycarbonylthiamine is added phenylthiothiocarbonyl chloride (9.44 parts by weight) at −30° – −20° C, and the mixture is stirred for 1.5 hours. Then, the reaction mixture is adjusted to pH 2.0 with ethanolic hydrogen chloride and evaporated under reduced pressure. The residue is extracted with chloroform, the extract is washed with water, sodium hydrogen carbonate solution and water successively, dried with anhydrous sodium sulfate and evaporated. The residue is crystallized by treatment with ethyl acetate and recrystallized from ethyl acetate-ether to give O-ethoxycarbonyl-S-phenylthiothiocarbonylthiamine (21.7 parts by weight), m.p. 161°–162° C. Anal. Calcd. for $C_{22}H_{26}O_4N_4S_3$: C, 52.18; H, 5.17; N, 11.06; S, 18.98. Found: C, 52.12; H, 5.05; N, 11.02; S, 18.67. IR $\nu_{max}^{Nujol}$ $cm^{+1}$: 1746, 1669, 1258, 1042, 1011.

Procedure 1b

O-Ethoxycarbonylthiamine chloride hydrochloride (21.5 parts by weight) is dissolved in 10 percent aqueous sodium hydroxide solution (60 parts by weight) and the mixture is allowed to stand for 30 minutes under ice-cooling. To the thus prepared solution of S-sodium salt of O-ethoxycarbonylthiamine is added a solution of carbon disulfide (11.4 parts by weight) in dimethylformamide (200 parts by volume), and the mixture is stirred for 15 minutes under ice-cooling. To the mixture is added dropwise a solution of diphenyliodonium iodide (22.5 parts by weight) in dimethylformamide (200 parts by volume) at 0° – 4° C, and the mixture is stirred at the same temperature for 7 hours. After dilution with water, the mixture is extracted with chloroform, the extract is washed with water, and dried with anhydrous magnesium sulfate. After removal of the solvent, the residue is purified by silica-gel chromatography, and then recrystallized from ethyl acetate-ether to give O-ethoxycarbonyl-S-phenylthiothiocarbonylthiamine (18 parts by weight), which is identical with that produced by the procedure 1a.

Procedure 2a

To a suspension of S-sodium salt of thiol-type thiamine (9.0 parts by weight) in anhydrous ethanol (60 parts by volume) is added dropwise phenylthiothiocarbonyl chloride (4.2 parts by weight) at −17° – −15° C, and the mixture is stirred at the same temperature for 2 hours. The temperature is elevated to room temperature, and the precipitates are collected by filtration. After washing with ice-cooled water, the precipitates collected are recrystallized from chloroform to give S-phenylthiothiocarbonylthiamine (8.1 parts by weight), m.p. 90° – 91° C. Anal. Calcd. for $C_{19}H_{22}O_2N_4S_3$: C, 52.51; H, 5.10; N, 12.89; S, 22.13. Found: C, 48.38; H, 4.99; N, 12.51; S, 21.14.

To a solution of S-phenylthiothiocarbonylthiamine (8.1 parts by weight) in chloroform (100 parts by volume) is added dropwise another solution of phosgene (2.5 parts by weight) in toluene (5 parts by volume), and the resultant mixture is stirred at room temperature (10° –30° C) for 3 hours. After removal of the solvent under reduced pressure, the residue is added with ethanol (20 parts by volume), and the mixture is heated at 50° C for 1 hour. Evaporating under reduced pressure, the residue is extracted with chloroform, the extract is washed with water, sodium hydrogen carbonate solution and water successively, dried with anhydrous sodium sulfate and evaporated. The residue is recrystallized from ethyl acetate-ether to give O-ethoxycarbonyl-S-phenylthiothiocarbonylthiamine (15 parts by weight), which is identical with that produced by the procedure 1a.

Procedure 2b

To a suspension of S-sodium salt of thiol-type thiamine (containing 2 molar equivalents of sodium chloride) (2.25 parts by weight) in dimethylformamide (20 parts by volume) is added carbon disulfide (1.14 parts by weight), and the mixture is stirred for 10 minutes at 0° –4° C. Then, to the mixture is added dropwise a solution of diphenyliodonium iodide (2.18 parts by weight) in dimethylformamide (20 parts by volume) at 0° –4° C and the mixture is stirred at the same temperature for 4 hours. After dilution with water, the mixture is extracted with chloroform, the extract is washed with water, dried with anhydrous sodium sulfate, and evaporated. The residue is purified by silica-gel chromatography, and then recrystallized from chloroform to give S-phenylthiothiocarbonylthiamine (1.2 parts by weight), m.p. 90°–91° C, which is identical with that obtained in the procedure 2a.

The intermediary product is subsequently treated with phosgene and ethanol in the same manner as described in procedure 2a to give O-ethoxycarbonyl-S-phenylthiothiocarbonylthiamine (1.0 part by weight), which is identical with that produced by the procedure 1a.

EXAMPLE 2.

Preparation of O-ethoxycarbonyl-S-(p-tolylthio)-thiocarbonylthiamine

Procedure 1a

To a suspension of S-ethoxycarbonylthiamine (11.7 parts by weight) in anhydrous ethanol (150 parts by volume) is added dropwise a solution of metallic sodium (0.77 part by weight) in anhydrous ethanol (100 parts by volume) at −30° −−20° C. The mixture is warmed to 20° C and allowed to stand at the same temperature for 5 minutes. To the thus prepared solution of S-sodium salt of O-ethoxycarbonylthiamine is added (p-tolylthio)-thiocarbonyl chloride (6.7 parts by weight) at −30° −−20° C, and the mixture is stirred for 1.5 hours. Working up in a similar manner to the procedure 1a of Example 1., the crude product is recrystallized from ethyl acetate-ether to give O-ethoxycarbonyl-S-(p-tolylthio)-thiocarbonylthiamine (12 parts by weight), m.p. 109° –111° C. Anal. Calcd. for $C_{23}H_{28}ON_4S_3$: C, 53.05; H, 5.42; N, 10.76; S, 18.47. Found: C, 52.66; H, 5.31; N, 10.74; S, 18.21. IR $\nu_{max}^{Nujol}$ cm$^{+1}$: 1738, 1670, 1254, 1040, 1010.

Procedure 1b

S-Ethoxycarbonylthiamine (17.4 parts by weight) is added to 5 percent aqueous sodium hydroxide solution (40 parts by weight) and the mixture is stirred at room temperatures for 15 minutes. To the mixture is added a solution of carbon disulfide (11.4 parts by weight) in dimethylformamide (200 parts by volume), and the resultant mixture is stirred for 15 minutes under ice-cooling. To the mixture is added dropwise a solution of di-(p-tolyl)-iodonium iodide (23.5 parts by weight) in dimethylformamide (200 parts by volume) at 0°–4° C, and the mixture is stirred at the same temperature for 7 hours. Working up on a similar manner to the procedure 1b of EXAMPLE 1., there is obtained O-ethoxycarbonyl-S-(p-tolylthio)-thiocarbonylthiamine (1.6 parts by weight), which is identical with that produced by the procedure 1a of this Example.

Procedure 2a

To a suspension of S-sodium salt of thiol-type thiamine (5.1 parts by weight) in anhydrous ethanol (35 parts by volume) is added dropwise p-tolylthiothiocarbonyl chloride (2.5 parts by weight) below −10° C, and the mixture is allowed to stand at the same temperature for 2 hours. The temperature is gradually elevated to room temperature, and the precipitates are collected by filtration. After washing with water, recrystallization from ethanol gives S-(p-tolylthio)-thiocarbonylthiamine (3.2 parts by weight), m.p. 117° –118° C (decompd.). Anal. Calcd. for $C_{20}H_{24}O_2N_4S_3$: C, 53.53; H, 5.39; N, 12.49; S, 21.44. Found: C, 53.89; H, 5.22; N, 12.47; S, 21.14.

To a solution of S-(p-tolylthio)-thiocarbonylthiamine (3.0 parts by weight) in chloroform (50 parts by volume) is added dropwise another solution of phosgene (1.0 part by weight) in toluene (2 parts by volume), and the resultant mixture is stirred at room temperature (10° –30° C) for 3 hours. After removal of the solvent under reduced pressure, the residue is added with ethanol (10 parts by volume), and the mixture is heated at 50° C for 1 hour. Evaporating under reduced pressure, the residue is extracted with chloroform, the extract is washed with water, sodium hydrogen carbonate and water successively, dried with anhydrous sodium sulfate and evaporated. The residue is recrystallized from ethyl acetate-ether to give O-ethoxycarbonyl-S-(p-tolylthio)-thiocarbonylthiamine (3.0 parts by weight), which is identical with that produced by the procedure 1a of this EXAMPLE.

Procedure 2b

To a suspension of S-sodium salt of thiol-type thiamine (containing 2 molar equivalents of sodium chloride) (22.5 parts by weight) in dimethylformamide (200 parts by volume) is added carbon disulfide (11.4 parts by weight), and the mixture is stirred at 0° –4° C for 10 minutes. Then, to the mixture is added dropwise a solution of di-(p-tolyl)-iodonium iodide (21.8 parts by weight) in dimethylformamide (200 parts by volume) at 0° –4° C, and the mixture is stirred at the same temperature for 4 hours. After dilution with water, the mixture is extracted with chloroform, the extract is washed with water, dried with anhydrous sodium sulfate, and evaporated. The residue is purified by silica-gel chromatography, and then recrystallized from chloroform to give S-(p-tolylthio)-thiocarbonyl thiamine (13.5 parts by weight), which is identical with that produced in the procedure 2a of this Example.

The intermediary product is subsequently treated with phosgene and ethanol in the same manner as described in the procedure 2a of this example to give O-ethoxycarbonyl-S-(p-tolylthio)-thiocarbonylthiamine (12.0 parts by weight), which is identical with that produced in the procedure (1a) of this example.

EXAMPLE 3

Preparation of O-Ethoxycarbonyl-S-(3,5-xylythio)-Thiocarbonylthiamine

Procedure 1a

To a suspension of S-ethoxycaronbylthiamine (17.7 parts by weight) in anhydrous ethanol (150 parts by volume) is added dropwise a solution of metallic sodium (1.15 parts by weight) in anhydrous ethanol (100 parts by volume) at 10° –15° C. The mixture is warmed to 20° C and allowed to stand at the same temperature for 5 minutes. To the thus prepared solution of S-sodium salt of O-ethoxycarbonylthiamine is added 3,5-xylythiothiocarbonyl chloride (10.8 parts by weight) at −30° −−20° C, and the mixture is stirred for 1.5 hours. Then, the reaction mixture is adjusted to pH 2.0 with 20 percent ethanolic hydrogen chloride, evaporated under reduced pressure, and the residue is extracted with chloroform. The extract is washed with water, sodium hydrogen carbonate solution and water successively, dried with anhydrous sodium sulfate and evaporated. The residue is recrystallized from ethyl acetate-ether to give O-ethoxycarbonyl-S-(3,5-xylylthio)-thiocarbonylthiamine (1.5 parts by weight), m.p. 94° –95° C. Anal. Calcd. for $C_{24}H_{30}O_4N_4S_3$: C, 53.92; H, 5.65; N, 10.48; S, 17.98. Found: C, 54.09; H, 5.52; N, 10.32; S, 17.95. IR $\nu_{max}^{Nujol}$ cm$^{+1}$: 1735, 1038.

Procedure 1b

O-Ethoxycarbonyl-S-(3,5-xylylthio)-thiocarbonylthiamine is produced in a similar manner to the procedure 1b of EXAMPLE 1, but using di-(3,5-xylyl)-iodonium iodide in place of diphenyliodonium iodide.

Procedure 2a

O-Ethoxycarbonyl-S-(3,5-xylylthio)-thiocarbonylthiamihe is produced from S-sodium salt of thiol-type thiamine via S-(3,5-xylylthio)-thiocarbonylthiamine in a similar manner to the procedure 2a of Example 1, but using 3,5-xylylthiothiocarbonyl chloride in place of phenylthiothiocarbonyl chloride.

Procedure 2b

O-Ethoxycarbonyl-S-(3,5-xylylthio)-thiocarbonylthiamine is produced form S-sodium salt of thiol-type thiamine via S-(3,5-xylylthio)-thiocarbonylthiamine in a similar manner to the procedure 2b of Example 1, but using di-(3,5-xylyl)-iodonium iodide in place of diphenyliodonium iodide.

EXAMPLE 4.

Preparation of O-Ethoxycarbonyl-S-(O-Bromophenylthio)-Thiocarbonylthiamine

Procedure 1a

To a suspension of S-ethoxycarbonylthiamine (44.4 parts by weight) in anhydrous ethanol (600 parts by volume) is added dropwise a solution of metallic sodium (28.8 parts by weight) in anhydrous ethanol (200 parts by volume) at 10° C. The mixture is warmed to 20° C and allowed to stand at the same temperature for 5 minutes. To the thus prepared solution of S-sodium salt of O-ethoxycarbonylthiamine is added o-bromophenylthiothiocarbonyl chloride (32.5 parts by weight) at −40° −−30° C, and the mixture is stirred at 1.5 hours. The reaction mixture (pH 8.0) is evaporated under reduced pressure and the residue is extracted with chloroform. The extract is washed with water, dried with anhydrous sodium sulfate and evaporated. The residue is recrystallized from ethanol to give O-ethoxycarbonyl-S-(o-bromophenylthio)-thiocarbonylthiamine (51.5 parts by weight), m.p. 145° −148° C (decompd.). Anal. Calcd. for $C_{22}H_{25}O_4N_4S_3Br$: C, 45.12; H, 4.30; N, 9.57; S, 16.43. Found: C, 45.29; H, 4.40; N, 9.34; S, 16.27. IR $\nu_{max}^{Nujol}$ cm$^{+1}$: 1747, 1046.

Procedure 1b

O-Ethoxycarbonyl-S-(o-bromophenylthio)-thiocarbonylthiamine is produced in a similar manner to the procedure 1b of Example 1, but using di-O-bromophenyl)-iodonium iodide in place of diphenyliodonium iodide.

Procedure 2a

O-Ethoxycarbonyl-S-(O-bromophenylthio)-thiocarbonylthiamine is produced from S-sodium salt of thiol-type thiamine via S-(O-bromophenylthio)-thiocarbonylthiamine, m.p. 181° −183° C. (decompd.), in a similar manner to the procedure 2a of Example 1, but using O-bromophenylthiothiocarbonyl chloride in place of phenylthiothiocarbonyl chloride.

Procedure 2b

O-Ethoxycarbonyl-S-(O-bromophenylthio)-thiocarbonylthiamine is produced from S-sodium salt of thiol-type thiamine via S-(O-bromophenylthio)-thiocarbonyl-thiamine in a similar manner to the procedure 2b of Example 1, but using di-(O-bromophenyl)-iodonium iodide in place of diphenyliodonium iodide.

EXAMPLE 5.

Preparation of O-Ethoxycarbonyl-S-(P-Methoxyphenylthio)-Thiocarbonylthiamine

Procedure 1a

To a solution of metallic sodium (3.16 parts by weight) in anhydrous ethanol (600 parts by volume) is added at 10° C S-ethoxycarbonylthiamine (48.7 parts by weight), and the mixture is stirred at 20° C for 5 minutes. To the thus prepared solution of S-sodium salt of O-ethoxycarbonylthiamine is added P-methoxyphenylthiothiocarbonyl chloride (30 parts by weight) at −30°- −20° C, and the mixture is stirred at the same temperature for 1.5 hours. After removal of ethanol, the residue is extracted with chloroform. The extract is washed with water, dried with anhydrous sodium sulfate, and evaporated. The residue is purified by silica-gel chromatography, and fractions eluted with acetone containing O-ethoxycarbonyl-S-(P-methyoxyphenylthio)-thiocarbonylthiamine are collected. After evaporation, the residue is treated with a saturated ethereal solution of oxalic acid and the precipitated crystals are collected by filtration. Recrystallization from ethanol gives O-ethoxycarbonyl-S-(P-methoxyphenylthio)-thiocarbonylthiamine oxalate (40 parts by weight), m.p. 133° −135° C. Anal. Calcd. for $C_{25}H_{30}O_9N_4S_3$: C, 47.91; H, 4.82; N, 8.94; S, 15.35. Found: C, 47.77; H, 4.86; N, 8.95; S, 14.94. IR $\nu_{max}^{Nujol}$ cm$^{+1}$: 1730, 1055.

Procedure 1b

O-Ethoxycarbonyl-S-(P-methoxyphenylthio)-thiocarbonylthiamine is produced in a similar manner to the procedure 1b of Example 1, but using di-(P-methoxyphenyl)-iodonium iodide in place of diphenyliodonium iodide.

Procedure 2a

O-Ethoxycarbonyl-S-(P-methoxyphenylthio)-thiocarbonuylthiamine is produced from S-sodium salt of thiol-type thiamine via S-(P-methoxyphenylthio)-thiocarbonylthiamine in a similar manner to the procedure 2a of Example 1, using P-methoxyphenylthiothiocarbonyl chloride in place of phenylthiothiocarbonyl chloride.

Procedure 2b

O-Ethoxycarbonyl-S-(p-methoxyphenylthio)-thiocarbonylthiamine is produced from S-sodium salt of thiol-type thiamine via S-(p-methoxyphenylthio)-thiocarbonylthiamine in a similar manner to the procedure 2b of Example 1, but using di-(p-methoxyphenyl)-iodonium iodide in place of diphenyliodonium iodide.

What is claimed is:

1. A member selected from the group consisting of the compounds of the formula:

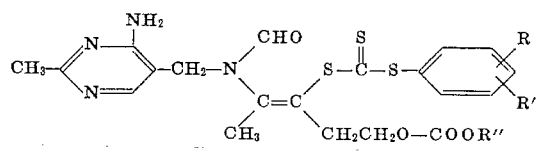

wherein R and R' each is a member selected from the group consisting of hydrogen, lower alkyl, lower alkoxy and halogen and R" is lower alkyl.

2. An O-(lower)-alkoxycarbonyl-S-phenylthiothiocarbonylthiamine.

3. An O-(lower)-alkoxycarbonyl-S-[(lower)-alkylphenylthio]-thiocarbonylthiamine.

4. An O-(lower)-alkoxycarbonyl-S-[di-(lower)-alkylphenylthio]-thiocarbonylthiamine.

5. An O-(lower)-alkoxycarbonyl-S-[(lower)-alkoxyphenylthio]-thiocarbonylthiamine.

6. An O-(lower)-alkoxycarbonyl-S-(halogenophenylthio)-thiocarbonylthiamine.

7. A compound according to claim 1 or 2, namely O-ethoxycarbonyl-S-phenylthiothiocarbonylthiamine.

8. A compound according to claim 1 or 3, namely O-ethoxycarbonyl-S-(p-tolylthio)-thiocarbonylthiamine.

9. A compound according to claim 1 or 4, namely O-ethoxycarbonyl-S-(3,5-xylylthio)-thiocarbonylthiamine.

10. A compound according to claim 1 or 5, namely O-ethoxycarbonyl-S-(p-methoxyphenylthio)-thiocarbonylthiamine.

11. A compound according to claim 1 or 6, namely O-ethoxycarbonyl-S-(o-bromophenylthio)-thiocarbonylthiamine.

* * * * *